United States Patent [19]

Wilsch et al.

[11] Patent Number: 4,941,620

[45] Date of Patent: Jul. 17, 1990

[54] APPARATUS FOR STORING FLEXIBLE WEBS ON THE CORES OF TAKEUP REELS

[75] Inventors: Herbert Wilsch, Unterhaching; Leonhard Huber, Glonn; Helmut Treiber, Munich; Peter Lermann, Weyarn; Erich Nagel, Anzing, all of Fed. Rep. of Germany

[73] Assignee: AGFA-Gevaert Aktiengesellschaft, Leverkusen, Fed. Rep. of Germany

[21] Appl. No.: 315,468

[22] Filed: Feb. 23, 1989

[30] Foreign Application Priority Data

Feb. 26, 1988 [DE] Fed. Rep. of Germany ....... 3806200

[51] Int. Cl.$^5$ ...................... B65H 18/10; B65H 20/02
[52] U.S. Cl. .................................. 242/67.1 R; 242/74
[58] Field of Search .................... 242/67.1 R, 74, 74.1, 242/74.2, 125.1, 56 R

[56] References Cited

U.S. PATENT DOCUMENTS

| | | | |
|---|---|---|---|
| 2,137,502 | 11/1938 | Nerwin | 242/74 |
| 2,915,256 | 12/1959 | Bruhn | 242/74.2 |
| 3,658,271 | 4/1972 | Austin et al. | 242/67.1 R |
| 4,116,394 | 9/1978 | Smith et al. | 242/125.1 X |
| 4,205,805 | 6/1980 | Yokota et al. | 242/74 |
| 4,346,856 | 8/1982 | Paietta | 242/74 |
| 4,494,706 | 1/1985 | Becherer et al. | 242/67.1 R X |
| 4,557,423 | 12/1985 | Zingler | 242/125.1 X |

FOREIGN PATENT DOCUMENTS 3034069 6/1982 Fed. Rep. of Germany.
3339618 9/1985 Fed. Rep. of Germany.

*Primary Examiner*—Katherine A. Matecki
*Attorney, Agent, or Firm*—Peter K. Kontler

[57] ABSTRACT

Apparatus for convoluting exposed and copied photographic films on the cores of takeup reels has an advancing mechanism which transports successive films along a given path so that the leaders of successive films can be engaged by the gripper of a pivotable arm serving to transfer the leader of the film in the path toward the peripheral surface of the core of an empty takeup reel. The reel has no flanges or is provided with a single flange carrying or adjacent a fixedly mounted or movable protuberance which defines with the peripheral surface of the core a gap for the leader of the film. Once the leader has entered the gap and the takeup reel is set in rotary motion, the film is wound onto the protuberance and is thus affixed to the core. The length of the protuberance is less than the axial length of the core but exceeds one-fourth of such axial length.

12 Claims, 3 Drawing Sheets

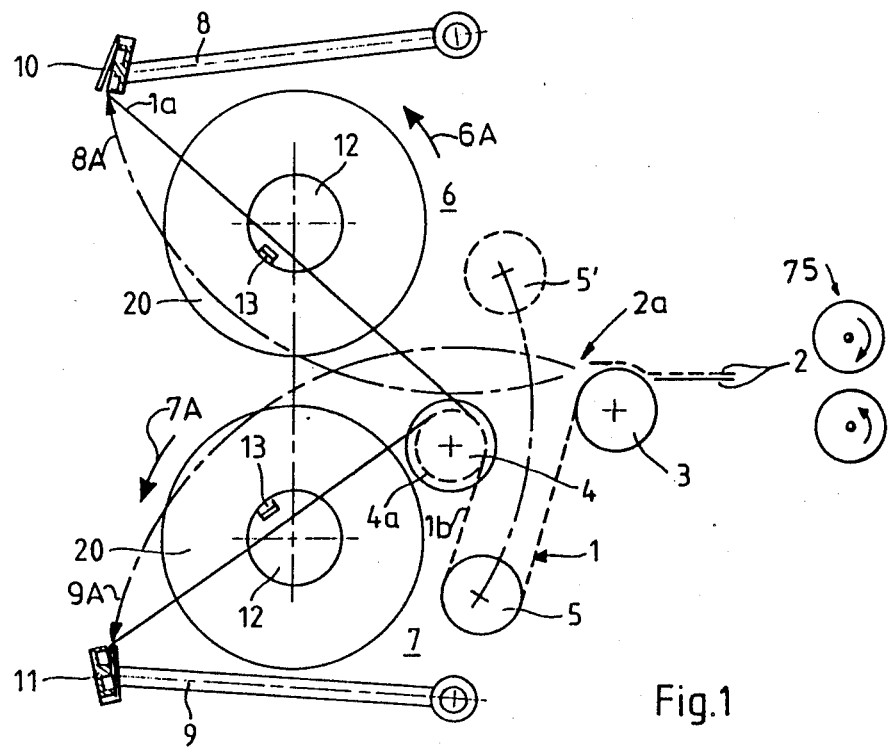
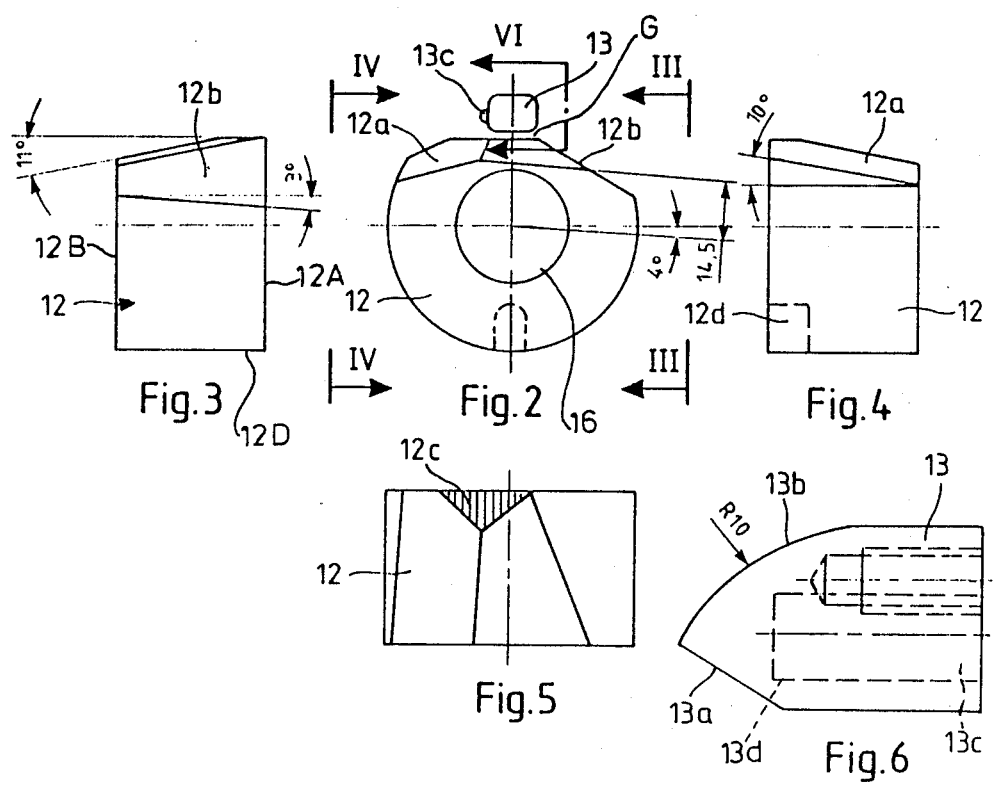

APPARATUS FOR STORING FLEXIBLE WEBS ON THE CORES OF TAKEUP REELS

BACKGROUND OF THE INVENTION

The invention relates to improvements in apparatus for convoluting webs of flexible material on the cores of takeup reels, and more particularly to improvements in those parts of such winding or convoluting apparatus which serve to affix the leaders of webs to the cores of takeup reels. Still more particularly, the invention relates to improvements in apparatus which can be used with advantage in arrangements for replacing rolls of customer films in copying machines. Arrangements of such type are disclosed in commonly owned copending patent application Ser. No. 264,311 filed Nov. 28, 1988 by for "Method of and apparatus for replacing rolls of customer films in copying machines".

The copending patent application Ser. No. 264,311 discloses a photographic copying machine wherein the images of successive film frames on a long web of spliced-together exposed and developed customer films are copied while successive films are advanced stepwise from a supply reel on a first driven mandrel toward a takeup reel on a second driven mandrel. The core of the takeup reel is designed for convenient attachment of the leader of the web, and the machine is further provided with a pivotable arm which serves to grip the leader of a web in a predetermined portion of the path for the web and to transfer the properly gripped leader to a position for attachment to the core of an empty takeup reel. Each takeup reel has two flanges which are disposed at the ends of the core and one of which supports a protuberance defining with the peripheral surface of the core a gap for reception of the leader of a web which is to be convoluted onto the core. The protuberance has a sloping surface which causes the leader of the web to slide sideways toward and partially into a recess in the other flange of the takeup reel. The web is thereupon caused to move laterally toward the one flange in response to rotation of the core so that a portion of the web slides into the gap between the core and the protuberance and the next-following portions of the web are wound around the protuberance. Reference may be had also to commonly owned German Offenlegungsschrift No. 30 43 069 of Payrhammer.

A drawback of the just described takeup reel is that it is rather heavy, bulky and not sufficiently versatile. This is due to the fact that the reel must be provided with two flanges one of which carries the protuberance and the other of which is formed with the recess opposite the protuberance. The mutual spacing of the flanges is fixed so that the takeup reel is capable of storing webs having a single predetermined width. Still further, the manipulation of such reels presents problems, especially if they are surrounded by a relatively small number of convolutions, i.e., if they are not used to capacity.

Modified apparatus for attaching the leaders of webs of photographic material to the cores of takeup reels are disclosed in commonly owned German Pat. No. 33 39 618 granted to Heidrich et al.

OBJECTS OF THE INVENTION

An object of the invention is to provide a novel and improved apparatus of the type wherein webs of flexible material are to be stored in convoluted condition on the cores of takeup reels and to provide such apparatus with novel and improved takeup reels.

Another object of the invention is to provide a takeup reel which can properly store flexible webs of photosensitive or other material even though it is devoid of flanges or is provided with a single flange.

A further object of the invention is to provide a novel and improved core for use in the above outlined takeup reel.

An additional object of the invention is to provide an apparatus which can manipulate wide and narrow webs with the same facility and which can be used as a superior substitute for conventional apparatus in existing photographic copying or like machines.

Still another object of the invention is to provide an apparatus which can be designed to maintain an empty or fresh takeup reel in a position of readiness while another reel is in the process of collecting a web of flexible material.

A further object of the invention is to provide a novel and improved method of automatically affixing the leaders of successive webs of flexible material to the cores of successive takeup reels.

Another object of the invention is to provide a photographic copying machine which embodies the above outlined apparatus using the above outlined takeup reels.

An additional object of the invention is to provide an apparatus whose operation can be automated to any desired extent and wherein the leaders of relatively narrow or relatively wide webs can be affixed to the cores of identical takeup reels.

A further object of the invention is to provide an apparatus wherein the leaders of successive webs can be affixed to the cores of the corresponding reels in a time-saving manner and without undue deformation and/or breakage of the leaders.

Another object of the invention is to provide a takeup reel which is constructed in such a way that it can maintain the convoluted web in an optimum position even though it is provided with a single flange or has no flanges at all.

An additional object of the invention is to provide a novel and improved method of preparing the above outlined takeup reel for attachment of the leader of a web to its core.

SUMMARY OF THE INVENTION

The invention is embodied in an apparatus for storing elongated flexible webs in convoluted condition, particularly for storing webs which contain a photosensitive material and have accessible leaders. Typical examples of such webs are exposed or unexposed photographic films and strips of photographic paper. The apparatus comprises advancing rolls or other suitable means for advancing successive webs along a predetermined path having a discharge end so that the leaders of successive webs assume predetermined positions at the discharge end of the path, at least one rotary driving member (such as a horizontal shaft) which is adjacent the discharge end of the path, a takeup reel which has a core removably coupled to the driving member and having an unobstructed first end, a second end and a peripheral surface, a protuberance which can be said to form part of the reel and is adjacent the second end and extends toward but short of the first end of the core so that the peripheral surface of the core and the protuberance define a gap which is open at its end facing the first end of the core, and means (e.g., a pivotable arm and a suitable gripper on the arm) for transferring the leader of the web in the path from the discharge end of such path into the gap so that the web is convoluted onto the peripheral surface and overlies the protuberance of the reel in response to rotation of the driving member.

The protuberance preferably extends from the second end toward the first end of the core a distance not less than one-fourth the distance between the first and second ends of the core.

The reel can further comprise a single flange which is adjacent the second end of the core.

In accordance with a first embodiment of the apparatus, the peripheral surface of the core has a substantially roof-shaped portion which is adjacent the gap and includes a first facet which is first to contact a leader during transfer of the leader into the gap and which has an orientation promoting a lateral movement of the leader in the gap away from the flange, and a second facet which is contacted by the leader in the gap subsequent to contact between the leader and the first facet and has an orientation promoting a lateral movement of the leader toward the flange. The facets of the substantially roof-shaped portion of the peripheral surface of the core can be disposed at opposite sides of the protuberance, as seen in the circumferential direction of the core. The roof-shaped portion of the peripheral surface can further comprise a third facet which is disposed between the first and second facets in a plane substantially parallel to the axis of the core. The third facet is nearer to the protuberance than the first and second facets.

That portion of the protuberance which is in contact with a web during winding of the web onto the core is preferably designed to have a high coefficient of friction. For example, such portion of the protuberance can have one or more sockets and an insert of friction generating material (e.g., silicon rubber) in each socket. The protuberance can further include a suitably inclined web guiding surface which confronts the gap, and a convex surface which faces away from the gap. The just discussed configurations of the core and protuberance promote predictable winding of the web around the core and around the protuberance as well as predictable entry of the leaders of successive webs into the gap.

The apparatus preferably further comprises guide means for the webs upstream or ahead of the takeup reel. Such guide means can be disposed between the discharge end of the path and the driving member for the core of the reel and can include an idler roller which is parallel to the core receiving motion from the driving member. The guide means further comprises a collar which extends radially outwardly beyond the roller and is engageable by that marginal portion of the leader of a web which is remote from the flange when the leader enters the gap. The collar preferably extends radially beyond the idler roller a distance which is approximately one-third of the width of a web.

The protuberance can be fixedly mounted on the flange of the takeup reel. Alternatively, the apparatus can further comprise means for moving the protuberance between a first position in which the protuberance and the peripheral surface of the core define the aforementioned gap and at least one second position in which the protuberance is remote from the core so that it does not interfere with winding of a web onto the peripheral surface of the core. The moving means can comprise means for moving the protuberance to the first position prior to transfer of the leader of a web from the discharge end of the path into the gap. The flange can be provided with an opening and the moving means can be designed to move the protuberance through the opening of the flange during movement of the protuberance between the first and second positions.

The moving means can include a sleeve-like element which is mounted on and is movable axially of the driving member. The protuberance shares the movements of the sleeve-like element and the moving means of such apparatus further comprises means for shifting the sleeve-like element axially of the driving member. The shifting means can comprise a double-acting fluid-operated (e.g., pneumatic) motor and a second element which is reciprocable by the motor in parallelism with the axis of the driving member. One of the two elements can be provided with a circumferential groove and the other of these elements is then provided with a follower which extends into the groove so that the sleeve-like element is compelled to share reciprocatory movements of the second element while remaining free to share rotary movements of the core and the driving member.

In accordance with a modification, the moving means can comprise a lever which is pivotally mounted on and is thus rotatable with the flange of the takeup reel. The protuberance is provided on or forms an integral part of the lever, and such moving means further comprises means for pivoting the protuberance and the lever between the first and second positions. The pivoting means can comprise a cam on the driving member and a follower which is mounted on the flange, which is operatively connected with the lever and which tracks the cam. The operative connection between the follower and the lever can comprise a bell crank which is pivotally mounted on the flange of the takeup reel and has a first arm carrying or constituting the follower and a second arm which engages or is engageable with the lever. The cam can be rotatably mounted on the driving member and the apparatus then further comprises means for holding the cam against movement with the driving member preparatory to pivoting of the lever so that the follower tracks the cam in response to rotation of the flange by the driving member while the holding means prevents the cam from rotating with the driving member. The holding means can comprise a projection on the cam and a stop which is movable into and from engagement with the projection. The lever is preferably arranged to move its protuberance through the aforementioned opening in the flange of the takeup reel during movement of the protuberance between its first and second positions. The pivoting means of such apparatus preferably includes a stationary member (such as the housing of a motor for the aforementioned stop) which can be mounted in the frame of the improved apparatus adjacent the flange of the takeup reel.

The lever can be mounted on the flange for pivotal movement in a plane which is tangential or nearly tangential to the core, and such lever is or can be disposed substantially at right angles to the plane of the flange in one of its positions (particularly in the first position of the protuberance). The moving means of such apparatus further comprises a bearing for the lever, and the bearing is movable tangentially of the core. The latter can be provided with a recess which receives the protuberance in the first position of the lever. The web whose leader is disposed in the gap is convoluted around the lever and is pinched between the protuberance in the recess and the core so that the lever is kept against movement from the first position by the web which is convoluted around it in response to tensioning of the web as a result of rotation of the driving member and the core.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is is a schematic elevational view of an apparatus which embodies one form of-the invention and wherein the protuberances are fixedly mounted on the flanges of the respective takeup reels;

FIG. 2 is an enlarged front elevational view of the core of one of the reels which are shown in FIG. 1;

FIG. 3 is a side elevational view of the core as seen in the direction of arrows from the line III—III of FIG. 2;

FIG. 4 is a side elevational view of the core as seen in the direction of arrows from the line IV—IV of FIG. 2;

FIG. 5 is a plan view of the core which is shown in FIG. 2

FIG. 6 is an enlarged side elevational view of the protuberance of one of the takeup reels which are shown in FIG. 1;

DESCRIPTION OF PREFERRED EMBODIMENTS

Figures 7, 8:
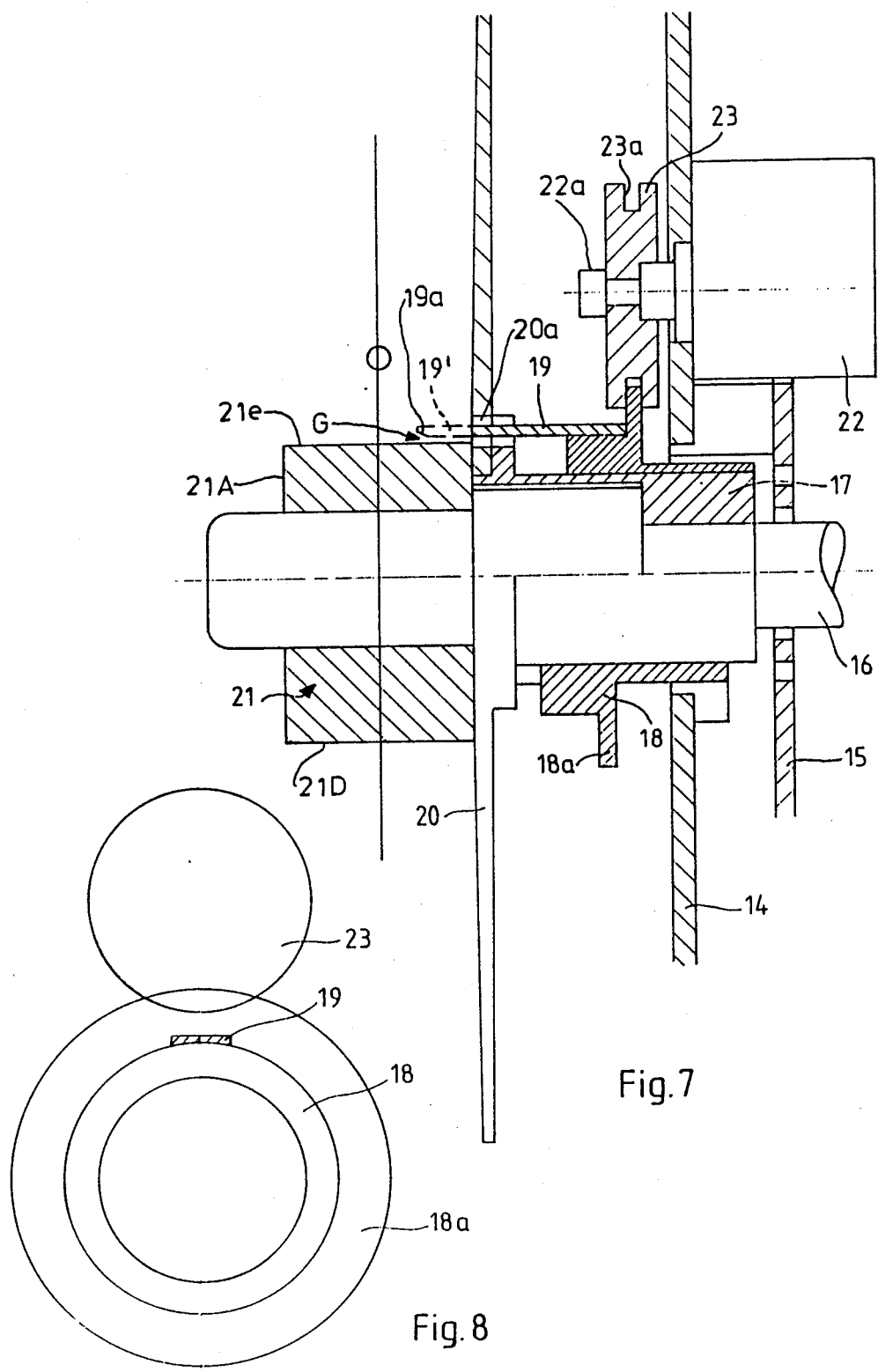
FIG. 7 is an enlarged partly elevational and partly central sectional view of a takeup reel with a movable protuberance and of means for moving the protuberance relative to the core and flange of the corresponding reel.
FIG. 8 is a front elevational view of the core, a sectional view of the protuberance and a front elevational view of an element of the means for shifting the protuberance relative to the core.

Referring first to FIG. 1, there is shown an apparatus which embodies the invention and serves to store elongated flexible webs 1 in convoluted condition on takeup reels, such as the reels 6 and 7 in the left-hand portion of FIG. 1. The apparatus comprises driven advancing rolls 75 which serve to advance successive webs 1 along an elongated path 2 and to bring successive webs 1 to a halt when the leader 1a of the web in the path 2 reaches the discharge end 2a of such path. This places the leader 1a into the range of a magnetically or otherwise operated gripper or tongs 10 on a pivotable arm 8, or into the range of a similar gripper or tongs 11 on a pivotable arm 9. The gripper 10 can properly locate the leader 1a of a web 1 with reference to the core 12 of the reel 6, and the gripper 11 can properly locate the leader 1a of a web with reference to the core 12 of the reel 7. The directions in which the arms 8 and 9 can pivot their grippers from the discharge end 2a of the path 2 to the positions shown in FIG. 1 are respectively indicated by the arrows 8A and 9A. The arrows 6A and 7A respectively indicate the directions in which the takeup reels 6 and 7 must be rotated by their respective driving members 16 in order to convolute the webs 1 onto the corresponding cores 12.

The apparatus of FIG. 1 further comprises guide means for successive webs 1. Such guide means is installed between the discharge end 2a of the path 2 and the cores 12 of the takeup reels 6, 7 and includes a first fixedly mounted idler roller 3 at the discharge end 2a, a second fixedly mounted idler roller 4 downstream of the idler roller 3, and a dancer roll 5 which is movable between a retracted or inoperative position (indicated by broken lines, as at 5') and an operative position (shown by solid lines) to thereby provide the web 1 with a loop 1b intermediate the idler rollers 3 and 4. The idler roller 4 is adjacent or is integral with a collar 4a extending radially beyond the peripheral surface of the roller 4 so as to hold the respective marginal portion of a web 1 against sidewise or lateral movement toward the observer of FIG. 1. It is preferred to select the diameters of the idler roller 4 and collar 4a in such a way that the extent to which the collar 4a projects radially beyond the peripheral surface of the idler roller 4 equals or approximates one-third the width of the web 1 in the path 2. The idler rollers 3, 4 and the dancer roll 5 are mounted on or in the frame or housing 14 (see FIG. 7) of the improved apparatus. The means for moving the dancer roll 5 relative to the idler rollers 3, 4 can comprise a lever or the like, not shown.

The manner in which successive frames of the web 1 in the path 2 are copied in a photographic copying machine forms no part of the present invention. Reference may be had to the aforementioned copending patent application Ser. No. 264,311 and to the publications which are mentioned therein. The same applies for the design of the mechanism for pivoting the web transferring means including the arms 8, 9 and their grippers 10, 11 in and counter to the directions which are indicated by the arrows 8A and 9A. The apparatus of FIG. 1 can operate with a single core 6 or 7 and with a single web transferring arm 8 or 9. If the apparatus employs two takeup reels, the reel 6 is maintained in a position of readiness while the reel 7 collects the intermittently advanced web 1, and the reel 7 is maintained in a position of readiness while the reel 6 collects a web 1. A freshly filled takeup reel is replaced with a fresh (empty) reel while the other reel collects the respective web. When the gripper 10 or 11 assumes the position which is shown in FIG. 1, it maintains the leader 1a of the respective web 1 in such position that a portion of the web extends along a straight path from the peripheral surface of the idler roller 4 and substantially tangentially of the core 12 of the respective takeup reel 6 or 7, or that the web is slightly deflected in the region of the respective core 12. In other words, at such time the web 1 can bypass the peripheral surface of the respective core 12, it can be in a mere linear contact with the core, or it can overlie a certain portion of the peripheral surface of the core.

The operation is as follows:

It is assumed that the advancing rolls 75 have advanced the leader 1a of a web 1 into the discharge end 2a of the path 2. At such time, the tip of the leader 1a preferably extends somewhat to the left beyond the first idler roller 3 toward the roller 4. The dancer roll 5 is then maintained in the inoperative position 5' and the arm 8 or 9 is caused to move its gripper 10 or 11 to the discharge end 2a where the gripper 10 or 11 is actuated (e.g., magnetically or mechanically) to engage the leader 1a before the arm 8 or 9 is pivoted to move its gripper 10 or 11 in the direction of the arrow 8A or 9A. This causes the portion of the leader 1a between the idler roller 4 and the gripper 10 or 11 to extend substantially or exactly tangentially of the respective core 12. The advancing rolls 75 are caused to advance the web 1 along and beyond the path 2 while the leader is being transferred by the gripper 10 or 11 so as to avoid undue tensioning and eventual breaking of the web. The dancer roll 5 can be caused to leave its inoperative or retracted position 5' as soon as it can no longer interfere with movement of the gripper 10 or 11 from the discharge end 2a of the path toward the position which is shown in FIG. 1. The roll 5 then provides the web 1 with a loop 1b which is disposed between the idler rollers 3, 4.

The gripper 10 or 11 causes the web 1 to penetrate into a gap G (see FIG. 2) between the peripheral surface 12D (see FIG. 3) of the respective core 12 and a protuberance 13 on the single flange 20 (FIG. 1) of the corresponding takeup reel 6 or 7. The manner in which the web 1 can penetrate into the gap G will be described below with reference to FIGS. 2 to 6. Once the web 1 has entered the gap G, the corresponding takeup reel 6 or 7 is set in rotary motion in the direction of arrow 6A or 7A. In order to ensure that the web 1 cannot leave the gap G, the length of the projection 13 preferably exceeds one-fourth the distance between the ends 12A and 12B of the respective core 12 (but such length is still considerably less than the distance between the ends 12A and 12B).

In order to convolute a relatively short portion of the web 1 behind its leader 1a onto the core 12 and onto the respective protuberance 13 (i.e., in order to affix the leader 1a to the respective core), the arm 9 can be pivoted clockwise while the core 12 of the lower takeup reel 7 is rotated in the direction of arrow 7A. On the other hand, the dancer roll 5 can be lifted from the operative position toward the level of the idler roller 4 while the takeup reel 6 is rotated in the direction of arrow 6A in order to convolute a relatively short portion of a web 1 onto the respective core 12 so that the leader 1a of such web is adequate to and cannot slide relative to the peripheral surface 12D (see FIG. 3) of upper core 12 of FIG. 1. It normally suffices to cause a web 1 to form not much more than one-half of a full convolution around the peripheral surface 12D of the respective core 12; this ensures that the frictional engagement between the web and the core is sufficiently pronounced to prevent rotation of the core relative to the web. The gripper 10 or 11 is thereupon caused to release the leader 1a because the web will be convoluted onto the respective core 12 in response to each further angular movement of the reel 6 or 7 in the direction of arrow 6A or 7A. This completes the attachment of the leader 1a of a web 1 to the core 12 of the takeup reel 6 or 7.

FIGS. 2 to 5 illustrate a preferred form of a core 12 which can be used in the takeup reel 6 or 7 of FIG. 1. The peripheral surface 12D of this core has a roof-shaped portion which is located opposite the protuberance 13 (i.e., such roof-shaped portion is adjacent the gap G) and includes a first facet 12a, a second facet 12b and a third facet 12c between the facets 12a, 12b. The facet 12c is nearest the protuberance 13 and the facets 12a and 12b can be said to be disposed at opposite sides of the protuberance, as seen in the circumferential direction of the peripheral surface 12D of the core 12. The leader 1a of a web 1 which is engaged by the gripper 10 or 11 first contacts the facet 12a whose orientation is such that it slopes toward the axis of the core 12 in a direction from the flange 20 toward the free end 12A of the core. Such orientation of the facet 12a ensures that the web portion which engages the protuberance 13 and the facet 12a exhibits a tendency to slide from that end (12B) of the core 12 which is adjacent the flange 20 toward the end 12A, i.e., the facet 12a induces the adjacent portion of the leader 1a of the web 1 to slide off the protuberance 13. The web portion which contacts the core 12 then engages the facet 12c which is disposed substantially tangentially of the core 12 and is relatively short (see FIG. 5). The web 1 then engages the facet 12b whose orientation is opposite that of the facet 12a, i.e., the facet 12b tends to shift the web 1 sideways or laterally toward abutment of one marginal portion of the web with the flange 20. This ensures that the web slides into the gap G and is convoluted onto the peripheral surface 12D as well as around the protuberance 13 in response to rotation of the core 12 in a direction to wind the web onto the core.

The protuberance 13 has a convex surface 13b along which the web slides during engagement with the facet 12a of the core 12. It will be noted that the convex surface 13b assists the web in sliding laterally in a direction away from the flange 20 and off the protuberance so that the web can engage the facets 12c, 12b and can be induced, primarily by the facet 12b, to enter the gap G while moving sideways toward the flange 20. The convex surface 13b of the protuberance 13 faces away from the gap G and is adjacent a web guiding surface 13a which slopes in a direction toward the gap G and toward the flange 20 so as not to oppose a lateral movement of the web 1 into the gap while the web engages the facet 12b. It can be said that the facet 12a cooperates with the surface 13b to promote a lateral movement of the web 1 away from the flange 20 whereas the facets 12c, 12b cooperate with the guide surface 13a to promote a lateral movement of the web 1 in the opposite direction, i.e., toward the flange 20 and hence into the gap G. Such movement of the web, first away from and thereupon toward the flange 20, takes place in response to rotation of the core 12.

FIG. 6 shows that the protuberance 13 has a socket 13d for an insert 13c. The latter is made of a material (such as silicone caoutchouc) which has a very high coefficient of friction. If desired, the protuberance 13 can be provided with several recesses or sockets for discrete inserts which serve to promote adherence of the web to the front side of the protuberance, i.e., to that side around which the web is looped in response to rotation of the core 12.

FIG. 4 shows that the core 12 is formed with a recess or notch 12d which ensures predictable orientation of the core during engagement with the respective driving member 16. The position of the notch 12d is selected in such a way that, if the flange 20 is not rigid with the core 12, the core can be mounted on the driving member 16 only in an angular position in which the roof-shaped portion 12a–12c of the peripheral surface 12D of the properly mounted core is disposed opposite the protuberance 13 and defines therewith the gap G. Thus, the core 12 and the convoluted web 1 thereon can be detached from the driving member 16 while the flange 20 remains affixed to or is otherwise mounted on the driving member 16 or in the housing or frame 14. This simplifies the manipulation of the core and of the web thereon during removal from the apparatus of FIG. 1. Thus, the overall weight of the convoluted web and of the means supporting the convoluted web is reduced to a minimum. Secondly, the apparatus is less expensive because it need not be furnished with a large number of complex, heavy and expensive reels; all that is necessary is to furnish a number of cores 12. If the flange 20 is adequately secured to and shares the rotary movements of the driving member 16, the core 12 can be detachably secured to the flange 20 in lieu of being mounted directly on the driving member.

As described above, the web 1 which is to be affixed to a core 12 can move laterally (first away from and thereupon toward the flange 20 so that it can enter the gap G) in spite of the fact that the protuberance 13 is or can be fixedly mounted in the apparatus, i.e., in that part of the reel 6 or 7 which need not be detached when a fully convoluted web 1 is to be transferred from the position of FIG. 1 in order to provide room for a fresh core 12 which is to be surrounded by the convolutions of the next web.

The extent to which the web 1 can move laterally under the action of the facet 12a in conjunction with the convex surface 13b of the protuberance 13 is limited by the collar 4a. The latter is arranged to engage that marginal portion of the web 1 which is remote from the flange 20, i.e., the collar 4a engages one marginal portion and the flange engages the other marginal portion of the web which is in the process of being advanced along the path 2 and to be convoluted on the core 12 of the takeup reel 6 or 7. It goes without saying that the web 1 must be under at least some tension in order to be adequately held by the collar 4a and to be adequately guided for lateral movement, first by the facet 12a in conjunction with the convex surface 13b and thereupon by the facets 12c, 12b and guide surface 13a. Once a portion of the web has entered the gap G, the facet 12c ensures that the web is adjacent the flange 20 and forms a succession of convolutions which jointly form a roll adjacent the front side of the flange 20.

FIGS. 7 and 8 show a portion of a modified apparatus, and more particularly a modified takeup reel and modified means for moving the protuberance 19 of such reel relative to the flange 20 and core 21. The driving member 16 is a horizontal shaft which is rotatably journalled in a bearing (not shown) in the housing or frame 14 of the apparatus. The shaft 16 extends through an internal partition 15 of the housing 14 and into the axial bore or hole of the core 21. That portion of the shaft 16 which extends through and beyond the housing 14 is surrounded by a sleeve 17 and the latter is surrounded by a sleeve-like element 18 having a washer-like follower 18a extending into a circumferential groove 23a of a wheel-shaped element 23 forming part of a means for shifting the element 18 and the follower 19 thereon between an operative position (note the position 19' of the follower 19) and an inoperative or retracted position (note the position of the lower half of the element 18 in FIG. 7). The groove 23a can be replaced with a groove in the peripheral surface of the element 18, and the element 23 is then provided with a follower extending into the groove of the element 18. All that counts is to ensure that the protuberance 19 can be moved in parallelism with the axis of the shaft 16 between its operative and inoperative positions while the shaft 16 rotates the takeup reel including the flange 20 and the core 21.

The protuberance 19 can extend through an opening 20a of the flange 20 so that it defines with the peripheral surface 21D of the core 21 a narrow gap G when the element 18 is caused to assume its operative or extended position (not the upper half of the element 18 in FIG. 7). The width of the gap G preferably equals or even somewhat exceeds twice the thickness of a web (not shown in FIGS. 7 and 8) which is to be convoluted on the core 21 when the takeup reel of FIGS. 7 and 8 replaces the reel 6 or 7 of FIG. 1. As can be seen in FIG. 7, the free end portion of the protuberance 19 is provided with a chamfered surface 19a replacing the web guiding surface 13a of the protuberance shown in FIG. 6, i.e., the surface 19a guides protuberance 19 over the leader of a web while the protuberance is in motion toward the operative position 19'. When in the operative position 19', the protuberance 19 preferably extends beyond the single flange 20 of the takeup reel by a distance which exceeds one-fourth the distance between the flange 20 and the free end 21A of the core 12. For example, the length of that portion of the protuberance 19 which projects beyond the flange 20 toward the free end 21A of the core 21 can equal or approximate one-third of axial length of the core 21.

The means for shifting the sleeve 18 and the protuberance 19 between the operative and inoperative positions further comprises a double-acting fluid-operated (e.g., pneumatic) motor 22 which is mounted at the inner side of the housing 14 and has a reciprocable output member 22a carrying the element 23.

The means (not specifically shown) for non-rotatably but axially movably coupling the element 18 to the shaft 16 can comprise a tongue and groove connection or any other suitable torque transmitting means. The controls for the motor 23 are designed in such a way that the protuberance 19 can be extracted into or rearwardly beyond the opening 20a of the flange 20 when the protuberance is nearest to the element 23 on the output member 22a of the motor 22, i.e., when the protuberance assumes the angular position which is shown in FIGS. 7 and 8. This can be readily achieved in a number of ways, for example, by equipping the controls for the motor 22 with means for counting the number of convolutions of a web on the core 21 and for transmitting a signal which can initiate retraction of the protuberance 19 from the operative position 19' when the number of such convolutions reaches a preselected value. Moreover, such controls can be provided with an optical or other suitable scanner which monitors the position of an index or marker on the flange 20 or on a part which rotates with the flange to thus ensure that the motor 22 is actually started and retracts the protuberance 19 when the latter assumes the twelve o'clock position of FIGS. 7 and 8.

The protuberance 19 is maintained in the extended position 19' during attachment of the leader of a web to the core 21 in a manner which is substantially identical with that described in connection with FIG. 1. When the protuberance 19 is withdrawn, the takeup reel including the flange 20 and core 21 is ready to collect the entire web in response to rotation of the shaft 16 in a direction to wind the web onto the core 21.

The peripheral surface 21D of the core 21 is preferably provided with a simple flat 21e which is parallel to the axis of the core 21 and is adjacent the opening 20a of the flange 20. The leader of a web need not be moved laterally, first away from and thereupon toward the flange, in order to enter the gap G, because the protuberance 19 is movable relative to the core 21. The area of the flat 21e can be selected in such a way that the protuberance 19 (in the extended or operative position 19') can be placed at a distance from the axis of the shaft 16 less than the radius of the major portion of the peripheral surface 21D. This is desirable and advantageous because retraction of the protuberance 19 into or rearwardly beyond the opening 20a of the flange 20 necessitates the exertion of a lesser force and, in addition, even the innermost convolution of the web on the peripheral surface 21D of the core 21 can assume a truly cylindrical shape (because the protuberance 19 does not cause the innermost convolution to form an outwardly extending bulge).

If the peripheral surface 21D of the core 21 is provided with the flat 21e, it must be mounted on the shaft 16 in a predetermined angular position in which the flat 21e is immediately adjacent the protuberance 19. It is possible to employ a core 21 which has a truly cylindrical peripheral surface (without a flat) if the controls for the motor 22 and the slidability of various abutting surfaces relative to each other are selected with a view to ensure stoppage of the protuberance 19 in a predetermined angular position.

The flange 20 ma but need not be rigidly connected to or integral with the core 21.

An advantage of the apparatus which employs the structure of FIGS. 7 and 8 is that the takeup reels need not be provided with discrete protuberances, i.e., a protuberance 19 which is mounted in the housing 14 of the apparatus can cooperate with each of a series of successively employed cores 21 and flanges 20. It can be said that the takeup reel which is shown in FIGS. 7 and 8 has two separable sections, namely a first section including the core 21 and flange 20, and a second section including the protuberance 19. In addition the parts 20 and 21 of the first section can be separably connected to each other, i.e., each of these parts can be individually connected to and detached from the shaft 16.

Another advantage of the takeup reel of FIGS. 7 and 8 is that the leader of the web which is to be convoluted on the core 21 need not be shifted laterally, first away from and thereupon toward the flange 20. This will be readily appreciated since the gap G is formed after the leader of a web is already caused to extend substantially tangentially of the core 21 (e.g., in very close or immediate proximity to the flat 21e in response to movement of the gripper 10 or 11 of FIG. 1 from the discharge end 2a of the path 2 to the position which is shown in FIG. 1 by solid lines). The core 21 is thereupon rotated so as to loop a portion of the leader of the web around the protuberance 19 (in the extended position 19') and to thus ensure that the leader is in adequate frictional engagement with the peripheral surface 21D before the motor 22 is caused to extract the protuberance 19 into or rearwardly beyond the opening 20a of the flange 20 so that the protuberance cannot interfere with the winding of a web onto the external surface of the entire outermost convolution on the core 21.

The operation of the apparatus which includes the structure of FIGS. 7 and 8 is as follows:

When a fresh first section (20+21) of an empty takeup reel is properly mounted on one of the driving members 16 which are employed in the apparatus of FIG. 1, the motor 22 maintains the protuberance 19 in the retracted position but the angular position of the flange 20 is such that its opening 20a registers with the retracted protuberance 19. If the core 21 has a flat 21e, such flat is immediately adjacent the opening 20a. The angular position of the core then corresponds to that of the core 12 of the takeup reel 6 or to that of the core 12 of the takeup reel 7 of FIG. 1 i.e., the flat 21e is parallel to and adjacent the path of movement of the leader of a web 1 from the periphery of the idler roller 4 toward the gripper 10 or 11 in the illustrated position of the arm 8 or 9 of FIG. 1. This ensures that, when the gripper 10 or 11 is moved to the position of FIG. 1, the leader of the web abuts or is immediately adjacent the flat 21e. The motor 22 is then actuated to extend the protuberance 19 whereby the surface 19a of the protuberance slides over the leader of the web at the flat 21e and the flat defines with the protuberance a gap G for the leader of the web. The shaft 16 is then rotated to wind a portion of the leader of the web around the peripheral surface 21D. This results in the making of a loop whose bight receives the protuberance 19. It normally suffices to form a relatively small number of convolutions around the peripheral surface 21D (e.g., a single convolution) in order to ensure that the frictional engagement between the core 21 and the web suffices to prevent the core from sliding in the innermost convolution of the web. The motor 22 withdraws the protuberance 19 into or rearwardly beyond the opening 20a of the flange when the core 21 can no longer turn relative to the convoluted portion of the web, and the winding of such web onto the core 21 then proceeds at a rate which is determined by the speed of the copying machine, i.e., by the speed of movement of the web along its path 2.

Figure 9:
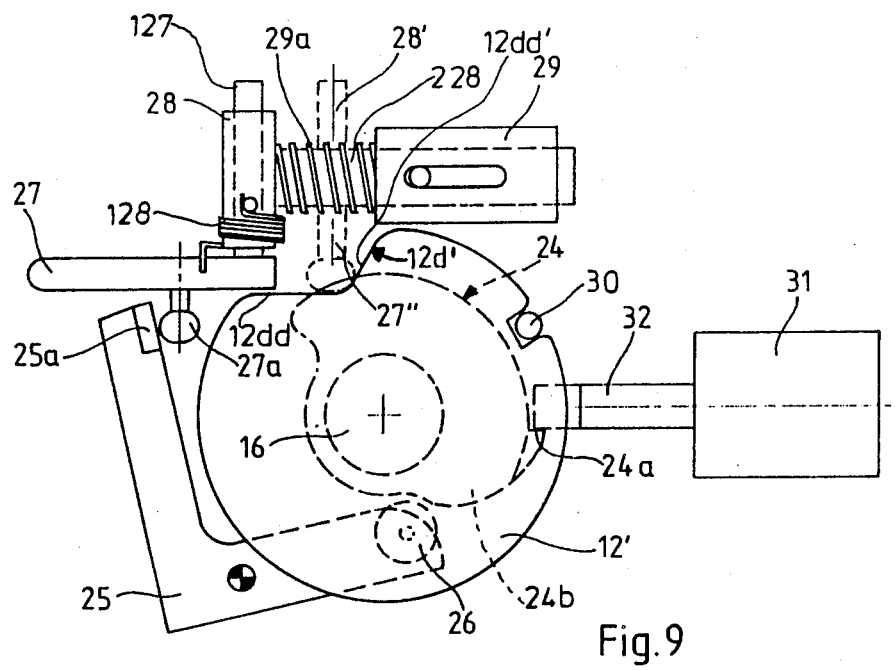
FIG. 9 is a front elevational view of a portion of a third apparatus wherein the protuberance is movable by a lever which is pivotably mounted on the flange of the takeup reel.
Figure 10:
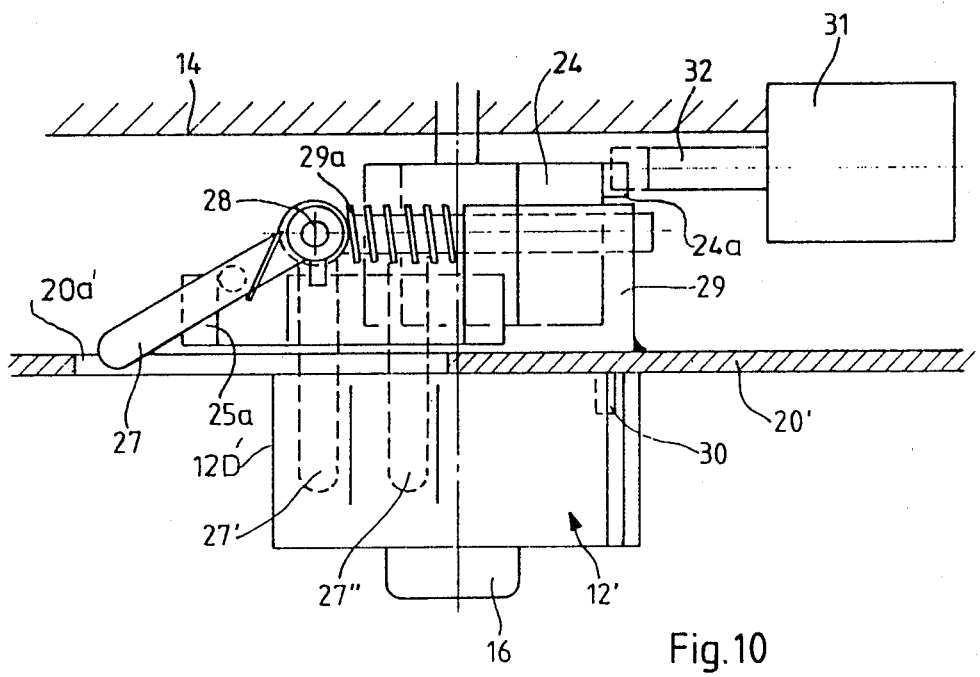
FIG. 10 is a partial plan and partial horizontal sectional view of the apparatus including the structure of FIG. 9.

FIG. 9 and 10 show a portion of an apparatus which employs modified takeup reels and a retractable protuberance 27a. The takeup reel which is shown in FIGS. 9 and 10 comprises a single flange 20' and a core 12'. The driving member for the core 12' is a horizontal shaft 16 which is driven in synchronism with the advancing means (75) for the webs and is separably coupled to the core 12' so that it can transmit torque thereto. The protuberance 27a forms part of or is attached to a lever 27 which is carried by the flange 20'. The latter has an opening 20a', for the lever 27 and such opening is configurated and dimensioned to permit the lever to move in a plane extending substantially tangentially of the core 12'. The peripheral surface 12D' of the core 12' has a recess or notch 12d' bounded by two mutually inclined surfaces 12dd and 12dd' which make an angle of approximately 120°. When the core 12' assumes the starting position of FIG. 9, the surface 12dd in the recess or notch 12d' is parallel to the path of movement of the lever 27 substantially tangentially of the core. The lever 27 is pivotable in such plane under the action or against the opposition of a torsion spring 128 on a bearing 28 for the pivot member 127 of the lever 27. The pivot member 127 is movable axially relative to the bearing 28 so that the lever 27 can be shifted from the solid-line (retracted) position to the broken-line intermediate position 27' and thence to the broken-line second position 27". The bearing 28 has an extension 228 which is reciprocable in a second bearing 29 at the rear side of the flange 20'. A coil spring 29a operates between the bearings 28 and 29 to urge the bearing 28 from the position 28' to the solid-line position of FIG. 9. A pin and slot connection is provided between the extension 228 and the bearing 29 to prevent rotation of the bearing 28 about the axis of the extension 228. When the lever 27 assumes the position 27' or 27", it extends substantially at right angles to the plane of the flange 20'. When in the position 27", the lever 27 urges its protuberance 27a against the leader of a web so that such leader is pinched between the protuberance 27a and the surface 12dd' in or close to the deepmost portion of the recess or notch 12d' in the peripheral surface 12D' of the core 12'.

The means for pivoting the lever 27 about the axis of its pivot member 127 includes a bell crank 25 which is fulcrumed on the flange 20' and has a first protuberance 27a and a second arm carrying a roller follower 26 which serves to track the peripheral surface of a disc cam 24 on the driving member 16. The cam 24 can rotate on the driving member 16 and has a radially outwardly extending tooth-shaped projection 24a engageable by a mobile stop 32 which can be reciprocated by a motor 31 having a stationary housing member affixed to the frame or housing 14.

The mode of operation of the apparatus embodying the structure of FIGS. 9 and 10 is as follows:

When the core 12' of the takeup reel is properly mounted on the flange 20', a notch in its peripheral surface receives a locating pin 30 of the flange. The gripper 10 or 11 of FIG. 1 then advances the leader of the web from the discharge end 2a of the path 2 so that the leader overlies the notch 12d' while the lever 27 is held in the retracted position which is indicated in FIG. 10 by solid lines. The flange 20' is then set in rotary motion by the driving member 16 which turns the cam 24. The motor 31 shifts the mobile stop 32 so that the latter extends into the path of movement of the projection 24a and arrests the cam 24 in a predetermined angular position to thus ensure predictable pivoting of the bell crank 25 (and hence of the lever 27) as the cam 24 is arrested but the bell crank 25 and its follower 26 continue to turn with the flange 20'. The flange 20' rotates counterclockwise, as seen in FIG. 9, and the follower 26 begins to track a lobe 24b of the cam 24 so that the bell crank 25 turns clockwise relative to the flange 20 and its lug 25a pivots the lever 27 through the medium of the protuberance 27a so that the lever moves from the solid-line position to the broken-line position 27' of FIG. 10. This places the lever 27 adjacent the web and, as the flange 20' continues to rotate, the web is looped around the lever 27. Additional rotation of the flange 20' in a counterclockwise direction causes the web to form a loop with a bight which receives the lever 27. Furthermore, the web urges the lever 27 toward the deepmost portion of the notch 12d' in the peripheral surface 12D' of the core 12' so that the bight of the web is pinched against the surface 12dd' bounding a portion of the notch 12d'. The follower 26 then advances beyond the lobe 24b of the cam 24 (which is held by the mobile stop 32 so that it cannot rotate with the driving member 16) and the lug 25a of the bell crank 25 moves away from the protuberance 27a of the lever 27. Nevertheless, the lever 27 cannot at such time return from the position 27" to the solid-line position of FIG. 10 because it is held by the convoluted web. The motor 31 then retracts the stop 32 so that the cam 24 is free to rotate with the driving member 16. Such retraction of the stop 32 takes place when the frictional engagement between the convoluted portion of the web and the core 12' suffices to ensure that the core cannot turn in the innermost convolution of the web.

When the winding of the entire web onto the core 12' is completed, the flange 20', the core 12' and the roll of convoluted web on the core 12' are removed from the housing 14 as a unit to be replaced with a fresh flange 20' and an empty core 12' thereon. The lever 27 (in the position 27") cannot interfere with detachment of the flange 20' and core 12' from the housing 14. The depth of the notch 12d' is preferably such that the convoluted web does not apply to the lever 27 any appreciable forces which would generate excessive friction and would cause the lever to strongly oppose detachment of the flange 20'. In order to further facilitate detachment of a loaded core 12' and its flange 20' from the housing 14, the protuberance 27a of the lever 27 can include or constitute a roller so that such roller rolls along the web in response to separation of the flange 20' and core 12' from the driving member 16. The springs 29a and 128 thereupon return the lever 27 to the solid-line position of FIG. 9.

The apparatus which embodies the structure of FIGS. 9 and 10 can be modified in a number of ways without departing from the spirit of the invention. For example, the lever 27 or an equivalent member can be mounted for movement substantially radially of the core 12' and the thus modified apparatus can comprise detent means for releasably holding the lever (e.g., by snap action) in its operative and inoperative positions.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. Apparatus for storing elongated flexible webs in convoluted condition, particularly for storing webs which contain a photosensitive material and have leaders, comprising means for advancing successive webs along a predetermined path having a discharge end so that the leaders of such webs assume predetermined positions at the discharge end of said path; at least one rotary driving member adjacent said discharge end; means for driving and separably coupling said rotary driving member with a takeup reel, the takeup reel comprising a cylindrical core having a first end, a second end, and a peripheral surface; a protuberance mounted at a predetermined location adjacent said rotary driving member; means for moving said protuberance with respect to the core of the takeup reel which is coupled to said at least one driving member between a first position in which said protuberance is adjacent to the peripheral surface of the core and defines therewith a gap and at least one second position in which said protuberance is remote from the peripheral surface of the core, the takeup reel being detachable from said at least one driving member and separable from said protuberance; and means for transferring the leader of the web from said discharge end of said path to a position against the peripheral surface of the core of the takeup reel which is coupled to said at least one driving member so that, upon movement of said protuberance; and means for transferring the leader of the web from said discharge end of said path to a position against the peripheral surface of the core of the takeup reel which is coupled to said at least one driving member so that, upon movement of said protuberance to said first position, the leader of the web being located in said gap, whereby rotation of said rotary driving member causes the web to be wound over said protuberance and convoluted onto the peripheral surface of the core of the reel which is coupled to said at least one driving member.

2. The apparatus of claim 1 wherein, in the first position thereof, said protuberance extends from said second end toward said first end of the core of the reel which is coupled to said at least one driving member a distance exceeding one-fourth of the distance between said first and second ends.

3. The apparatus of claim 1, wherein said takeup reel comprises a radially extending flange at the second end thereof which contacts one edge of the leader of the web, and further comprising guide means for the web, said guide means being disposed between said discharge end and said rotary driving member and including an idler roller having a longitudinal axis parallel to the longitudinal axis of the takeup reel which is coupled to said at least one driving member, the idler roller having a first end, a radially extending collar at the first end thereof, and a second end, the collar of the idler roller being engageable with the opposite side of said leader.

4. The apparatus of claim 3 for storing a web, wherein the web has a predetermined width, and said collar extends radially beyond said roller a distance which is approximately one-third of said predetermined width.

5. The apparatus of claim 1, wherein said moving means comprises means for moving said protuberance to said first position subsequent to transfer of the leader of the web from said discharge end against the peripheral surface of the core of the reel which is coupled to said at least one driving member.

6. The apparatus of claim 5, wherein said takeup reel comprises a radially extending flange at the second end thereof, and an opening through said flange, and said moving means is arranged to move said protuberance through the opening of the flange of the reel which is coupled to said at least one driving member during movement of the protuberance between said first and second positions.

7. The apparatus of claim 5, wherein said moving means includes a sleeve-like element mounted on and movable axially of said at least one driving member, said protuberance being movable with said sleeve-like element and said moving means further comprising means for shifting said sleeve-like element axially of said driving member.

8. The apparatus of claim 7, wherein said shifting means comprises a double-acting fluid-operated motor.

9. The apparatus of claim 7, wherein said shifting means includes a second element and means for reciprocating said second element in substantial parallelism with the axis of said driving member, one of said sleeve-like element and said second element having a circumferential groove and the other of said sleeve-like element and said second element having a follower extending into said groove, said groove and said follower comprising means for transmitting reciprocating movement of said rotation of said sleeve-like element.

10. The apparatus of claim 1, wherein said protuberance includes a portion in contact with the web which is being convoluted around said core, said portion of said protuberance having a high coefficient of friction.

11. The apparatus of claim 1, wherein said protuberance has a web guiding surface confronting said gap in the first position of said protuberance.

12. The apparatus of claim 1, wherein said protuberance has a convex surface facing away from said gap in the first position of said protuberance.

* * * * *